(12) United States Patent
Kenlon et al.

(10) Patent No.: US 10,918,208 B2
(45) Date of Patent: Feb. 16, 2021

(54) COMPACT STORAGE RACK SYSTEM

(71) Applicant: INTERMETRO INDUSTRIES CORPORATION, Wilkes-Barre, PA (US)

(72) Inventors: Gerard J. Kenlon, Vernon, NJ (US); Robert K. Swartz, Dallas, PA (US); Douglas Kaminski, West Wyoming, PA (US); John J. Megan, Shirley, MA (US); Andre F. Kabacinski, Wilkes-Barre, PA (US)

(73) Assignee: INTERMETRO INDUSTRIES CORPORATION, Wilkes-Barre, PA (US)

( * ) Notice: Subject to any disclaimer, the term of this patent is extended or adjusted under 35 U.S.C. 154(b) by 0 days.

(21) Appl. No.: 16/402,827

(22) Filed: May 3, 2019

(65) Prior Publication Data

US 2019/0350361 A1    Nov. 21, 2019

Related U.S. Application Data

(60) Provisional application No. 62/673,542, filed on May 18, 2018.

(51) Int. Cl.
*A47B 87/00* (2006.01)
*A47B 91/06* (2006.01)
(Continued)

(52) U.S. Cl.
CPC ............ *A47B 87/001* (2013.01); *A47B 91/06* (2013.01); *A47F 5/108* (2013.01);
(Continued)

(58) Field of Classification Search
CPC ... A47B 87/001; A47B 91/06; A47B 47/0083; A47B 47/024; A47B 53/00; A47B 53/02; B60B 33/0002; B60B 33/0063; B60B 19/12; B60B 3/001; B60B 2200/20; A47F 5/108; A47F 5/0018; A47F 5/0081; Y10T 16/3819; Y10T 16/195; B60T 3/00
See application file for complete search history.

(56) References Cited

U.S. PATENT DOCUMENTS 3,801,176 A * 4/1974 Higbee ................. A47B 53/02
312/199
3,883,004 A * 5/1975 Slaga ..................... A47F 7/163
211/162

(Continued)

OTHER PUBLICATIONS https://www.merriam-webster.com/dictionary/caster, definition of caster "any of a set of wheels or rotating balls mounted in a swivel frame and used for the support and movement of furniture, trucks, and portable equipment" (Year: 1828).*

*Primary Examiner* — Ko H Chan
(74) *Attorney, Agent, or Firm* — Harness, Dickey & Pierce, P.L.C.

(57) ABSTRACT

A compact storage rack system is disclosed. In an example implementation, the compact storage rack system includes a track assembly and a movable shelving assembly including a first set of wheels transitionally connected to the track assembly. The first set of wheels can transition along the track assembly between a first position corresponding to a retracted position and a second position corresponding to an extended position.

17 Claims, 9 Drawing Sheets

(51) Int. Cl.
*B60B 33/00* (2006.01)
*A47F 5/10* (2006.01)
*A47B 47/00* (2006.01)
*A47F 5/00* (2006.01)

(52) U.S. Cl.
CPC ...... *B60B 33/0002* (2013.01); *A47B 47/0083* (2013.01); *A47F 5/0018* (2013.01); *Y10T 16/195* (2015.01)

(56) References Cited

U.S. PATENT DOCUMENTS

| | | | | |
|---|---|---|---|---|
| 4,113,270 A * | 9/1978 | Barecki | ............... | A61G 3/0808 188/2 F |
| 4,221,396 A * | 9/1980 | Kehl | ................... | A61G 3/0808 188/2 F |
| 4,369,995 A * | 1/1983 | Harder, Jr. | ........... | A61G 3/0808 248/503 |
| 4,690,364 A * | 9/1987 | Constantin | ........... | A61G 3/0808 248/503.1 |
| 4,807,765 A * | 2/1989 | Brown | ................... | A47B 53/00 211/162 |
| 4,991,725 A * | 2/1991 | Welsch | .................. | A47B 53/02 211/162 |
| 5,004,304 A * | 4/1991 | Segerpalm | ............. | A47B 53/02 104/243 |
| 5,549,231 A * | 8/1996 | Fletcher | .................... | B60R 9/10 224/536 |
| 5,628,595 A * | 5/1997 | Harris | .................. | B60P 7/0807 410/4 |
| 6,036,286 A * | 3/2000 | Krumholz | ............. | A47B 88/42 211/162 |
| 6,231,138 B1 * | 5/2001 | Janson | ................... | A47B 53/02 312/201 |
| 7,506,773 B2 * | 3/2009 | Welsch | .................. | A47B 53/02 211/162 |
| 8,056,988 B2 * | 11/2011 | Pan | ........................ | A47B 63/00 312/201 |
| 8,375,638 B2 * | 2/2013 | Martin | .................... | E04B 2/827 49/409 |
| 8,789,899 B2 * | 7/2014 | Pirro | .................... | A47F 3/004 312/202 |
| 2003/0094884 A1* | 5/2003 | Sobol | ..................... | A47B 53/00 312/201 |
| 2012/0024923 A1* | 2/2012 | Cha | .......................... | B60R 9/06 224/533 |

* cited by examiner

COMPACT STORAGE RACK SYSTEM

CROSS-REFERENCE TO RELATED APPLICATIONS

This application claims the benefit of U.S. Provisional Application No. 62/673,542, filed on May 18, 2018. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a compact storage rack system and more specifically to a storage rack system having one or more movable storage shelving assemblies.

Typically, businesses and homes use one or more storage rack systems to store items. The storage rack systems can include multiple shelves that are connected to one another via multiple vertical posts, supports or poles.

SUMMARY

A compact storage rack system is disclosed. In an example implementation, the compact storage rack system includes a track assembly and a movable shelving assembly including a plurality of posts, a first set of wheels transitionally connected to the track assembly, and a second set of wheels not transitionally connected to the track assembly. The first set of wheels is rotationally fixed relative to a vertical axis of the plurality of posts and can transition along the track assembly between a first position corresponding to a retracted or stowed position and a second position corresponding to an extended or working position.

In other features, the track assembly includes a first base including a first rail, and the first set of wheels are transitionally connected to the first rail.

In other features, the track assembly further includes a spreader structure disposed between the first base and a second base, and the second base includes a second rail.

In other features, the spreader structure is a right angle structure.

In other features, the compact storage rack system includes a wheel keeper disposed at one end of the first base and configured to receive at least one wheel of the second set of wheels when the first set of wheels are in the first position.

In other features, the wheel keeper is a U-shaped bracket.

In other features, a wheel of the first set of wheels includes a first flange, a second flange, and a middle portion disposed between the first flange and the second flange, and the first flange and the second flange are configured to retain the middle portion over the first rail.

In other features, at least one wheel of the second set of wheels comprises a swivel caster wheel.

In other features, the compact storage rack system further includes a stationary shelving assembly disposed adjacent to the movable shelving assembly.

A compact storage rack system is disclosed. In an example implementation, the compact storage rack system includes a stationary shelving assembly, a plurality of track assemblies, and a plurality of movable shelving assemblies. Each movable shelving assembly includes a first set of wheels transitionally connected to a corresponding track assembly. A first movable shelving assembly of the plurality of movable shelving assemblies is disposed adjacent to the stationary shelving assembly, and the first set of wheels can transition along the track assembly between a first position corresponding to a retracted or stowed position and a second position corresponding to an extended or working position.

In other features, each track includes a first base including a first rail, and the first set of wheels are transitionally connected to the first rail.

In other features, each movable shelving assembly includes a second set of wheels not transitionally connected to the first rail.

In other features, at least one wheel of the second set of wheels comprises a swivel caster wheel.

In other features, each track assembly includes a spreader structure disposed between the first base and a second base, and the second base includes a second rail.

In other features, the spreader structure comprises a right angle structure.

In other features, each track assembly includes a wheel keeper disposed at one end of the first base and configured to receive at least one wheel of the second set of wheels when the first set of wheels are in the first position.

In other features, the wheel keeper comprises a U-shaped bracket.

In other features, a wheel of the first set of wheels includes a first flange, a second flange, and a middle portion disposed between the first flange and the second flange, and the first flange and the second flange are configured to retain the middle portion over the first rail.

In other features, a top surface of the first rail is elevated with respect to a top surface of the first base.

In other features, a compact storage rack system is disclosed. In an example implementation, the compact storage rack system includes a first stationary shelving assembly, a second stationary shelving assembly, a plurality of track assemblies, and a plurality of movable shelving assemblies disposed between the first stationary shelving assembly and the second stationary shelving assembly. Each movable shelving assembly of the plurality of movable shelving assemblies including a plurality of posts, a first set of wheels engaged with a corresponding track assembly at a wheel-rail interface, and a second set of wheels not engaged with the corresponding track assembly. The first set of wheels is configured to transition along the corresponding track assembly between a first position corresponding to a retracted position and a second position corresponding to an extended position. The first set of wheels is rotationally fixed relative to a vertical axis of the plurality of posts. The corresponding track assembly includes a wheel keeper that is configured to receive at least one wheel of the second set of wheels Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
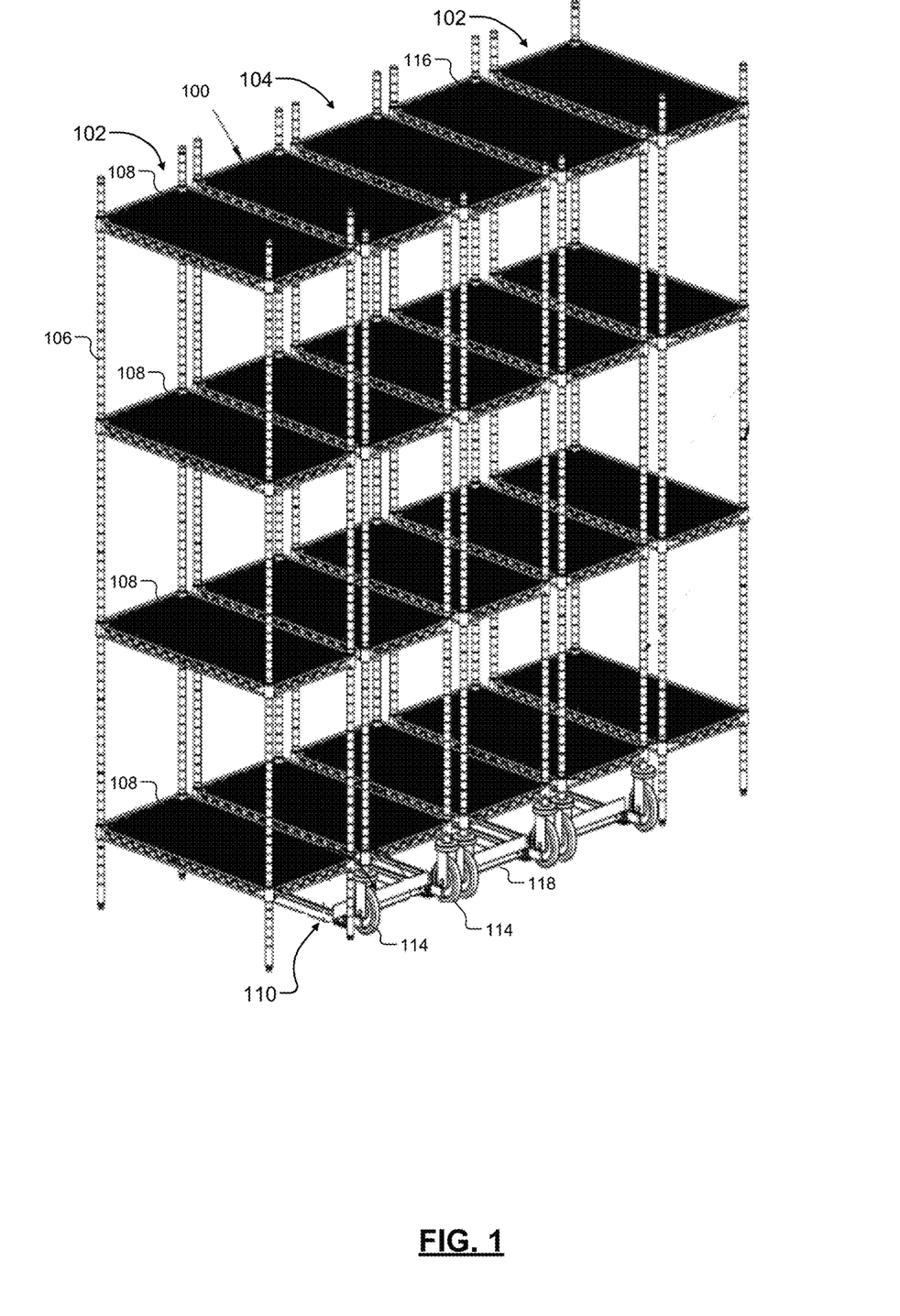
FIG. 1 is an isometric view of a compact storage rack system according to an example implementation of the present disclosure.

FIGS. 1 through 9 generally illustrate a compact storage rack system 100 according to an example implementation of the present disclosure. Referring to FIG. 1, the compact storage rack system 100 includes stationary shelving assemblies 102 and movable shelving assemblies 104. In an example implementation, the stationary shelving assemblies 102 comprise the lateral boundaries of the compact storage rack system 100 and the movable shelving assemblies 104 are disposed between the stationary shelving assemblies 102. Each of the shelving assemblies 102, 104 include vertical support posts or poles 106 and shelves 108 connected to the posts 106.

The movable shelving assemblies 104 are movable along a predetermined path between an extended or working position and a retracted or stowed position. In an implementation, the movable shelving assemblies 104 are movable along a respective track assembly 110. The movable shelving assemblies 104 include a first set of wheels 112 and a second set of wheels 114. The first set of wheels 112 is transitionally connected to the track assembly 110. In an implementation, the first set of wheels 112 may be rail wheels that engage with the track assembly 110 at a wheel-rail interface. Thus, when a force is applied to one or more movable shelving assemblies 104, the corresponding set of wheels 112 may rotate to allow lateral translation of the movable shelving assembly 104 along the track assembly 110.

The second set of wheels 114 is not disposed within the track assembly 110. In an example implementation, the first set of wheels 112 comprise wheels fixed with respect to the track assembly 110 (i.e., rotationally fixed relative to a vertical axis of the posts 106), and the second set of wheels 114 comprise swivel caster wheels. In an example implementation, the first set of wheels 112 is disposed along a first side 116 of the compact storage rack system 100, and the second set of wheels 114 is disposed along a second side 118 of the compact storage rack system 100.

Figure 2:
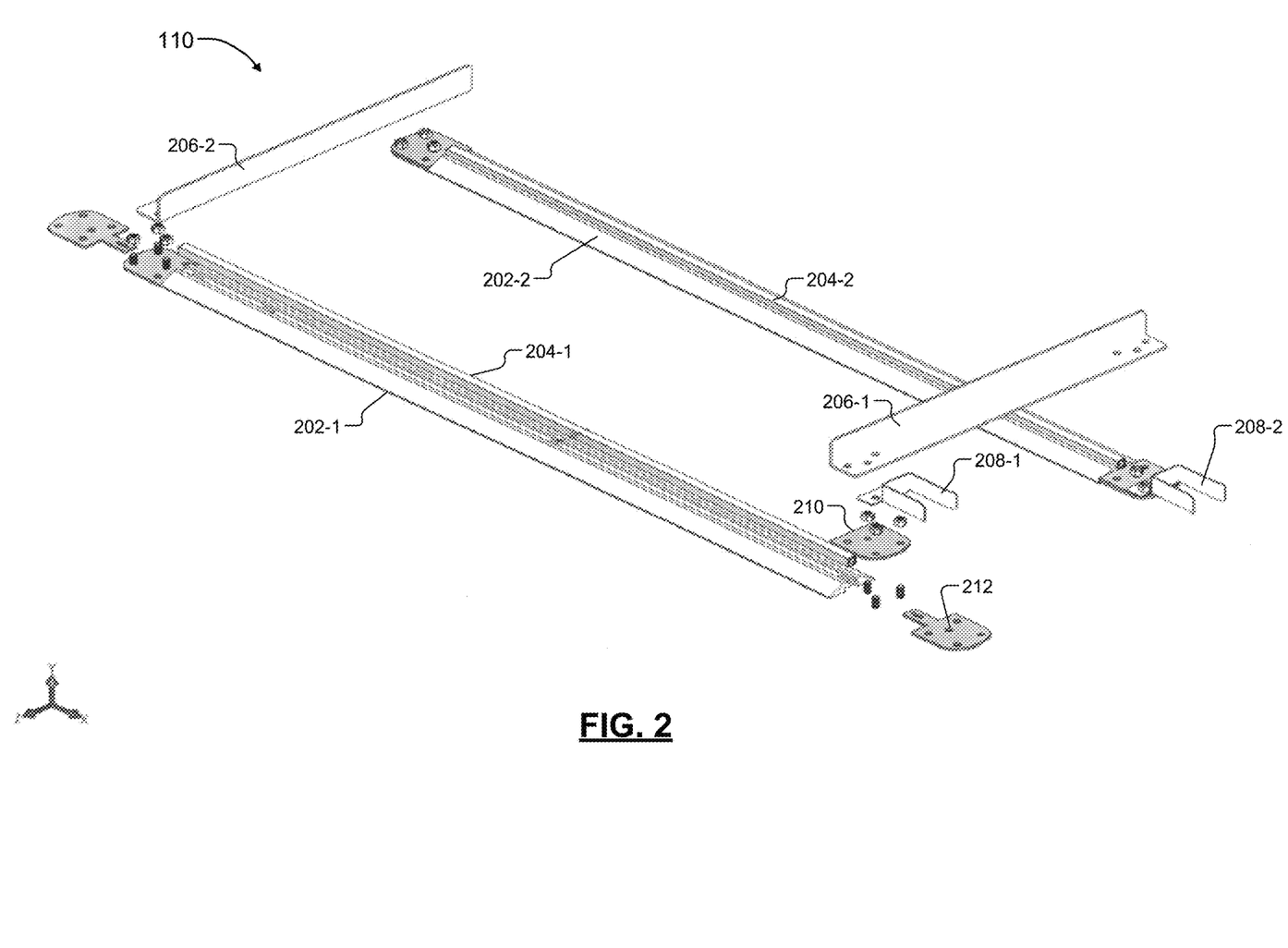
FIG. 2 is a partially exploded view of a track assembly according to an example implementation of the present disclosure.

FIG. 2 illustrates an example track assembly 110 according to an example implementation of the present disclosure. As shown, the track assembly 110 includes a first base 202-1 including a first rail 204-1 and a second base 202-2 including a second rail 204-2. The track assembly 110 also includes spreader structures 206-1, 206-2 disposed between the first base 202-1 and the second base 202-2. In an example implementation, the spreader structures 206-1, 206-2 may be right angle (e.g., L-shaped) structures. The track assembly 110 also includes wheel keepers 208-1, 208-2 that retain the corresponding wheels 114 when the movable shelving assembly 104 is in the retracted position. In an implementation, the wheel keepers 208-1, 208-2 may be a U-shaped bracket. The bases 202-1, 202-2, rails 204-1, 204-2, spreader structures 206-1, 206-2, and wheel keepers 208-1, 208-2 can be secured together to form the track assembly 110 using plates 210, 212 and fasteners. The fasteners may include screws, nuts/bolts, pins, or the like.

Figure 3:
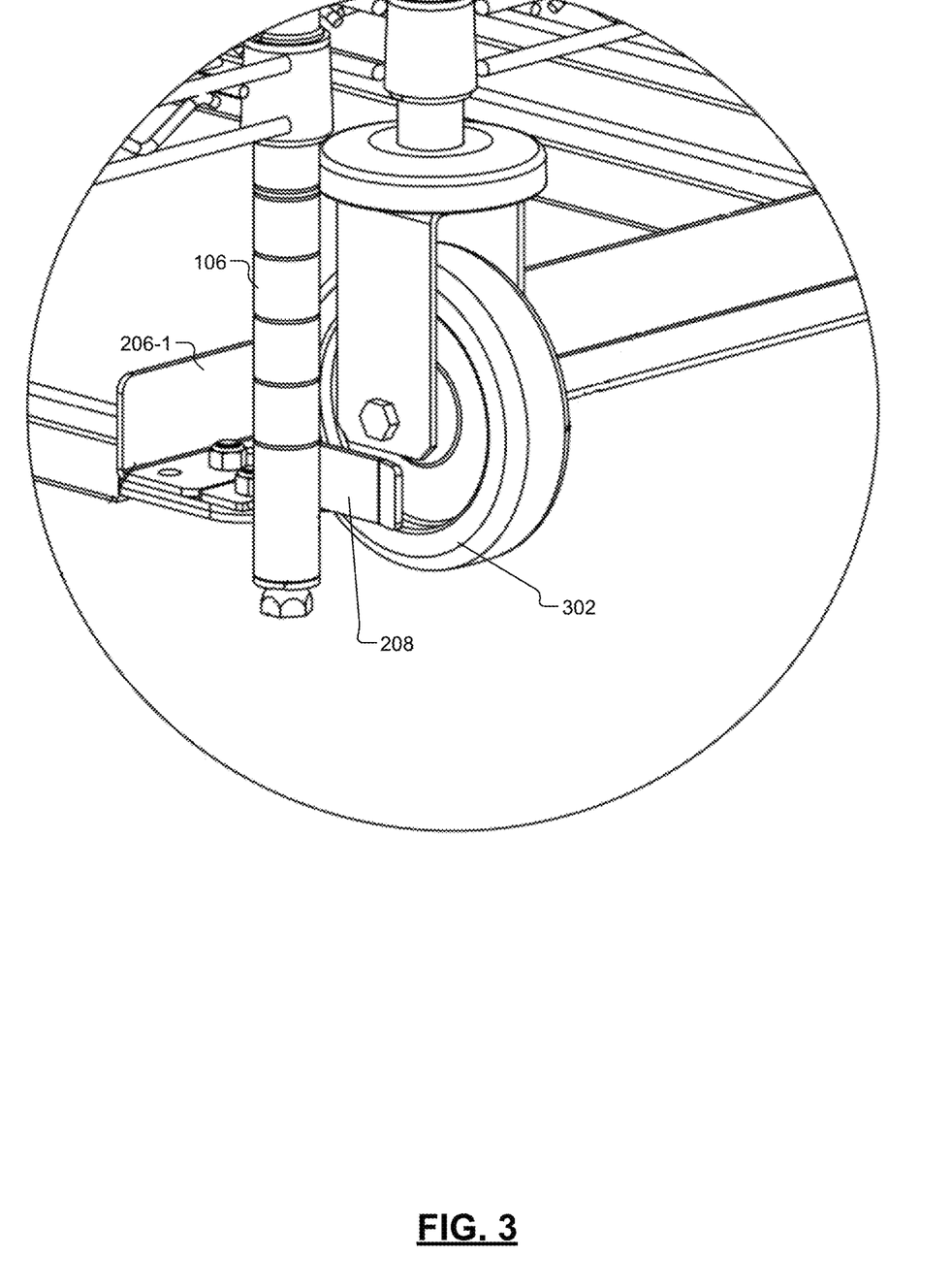
FIG. 3 is an enlarged, partial isometric detail view of a wheel of the compact storage rack system according to an example implementation of the present disclosure.
Figure 4:
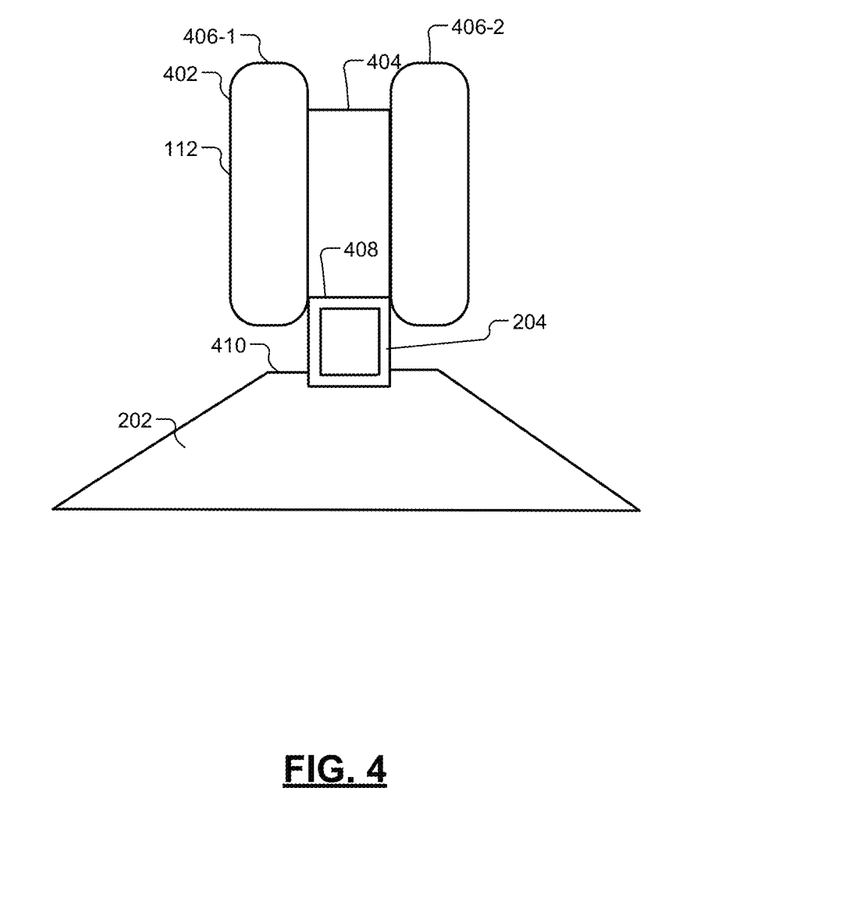
FIG. 4 is a partial front detail view of another wheel of the compact storage rack system retained on a rail of the track assembly according to an example implementation of the present disclosure.

FIG. 3 illustrates a wheel 302 of the second set of wheels 114 retained within a wheel keeper 208. FIG. 4 illustrates an example wheel 402 of the first set of wheels 112 disposed over and retained by a rail 204 according to an example implementation. As shown, the wheel 402 includes a middle portion 404 disposed between flanges 406-1, 406-2 to allow the middle portion 404 to rest on the rail 204 to maintain a wheel-rail interface, and the rail 204 is disposed within the base 202. The flanges 406-1, 406-2 assists to prevent the movable shelving assembly 104 from moving transverse with respect to the rail 204. As shown in FIG. 4, the rail 204 is retained within the base 202. In an example implementation, a top surface 408 of the rail 204 is elevated with respect to a top surface 410 of the base 202.

In various implementations, a user can apply a force (e.g., push or pull) to the movable shelving assembly 104 to cause the movable shelving assembly 104 to transition between the retracted position and the extended position. When a force is applied, the first set of wheels 112 traverse along the rails 204-1, 204-2 between the retracted position and the extended position. The second set of wheels 114 traverse along a surface, such as a floor, and are not retained within rails 204-1, 204-2.

Figure 5:
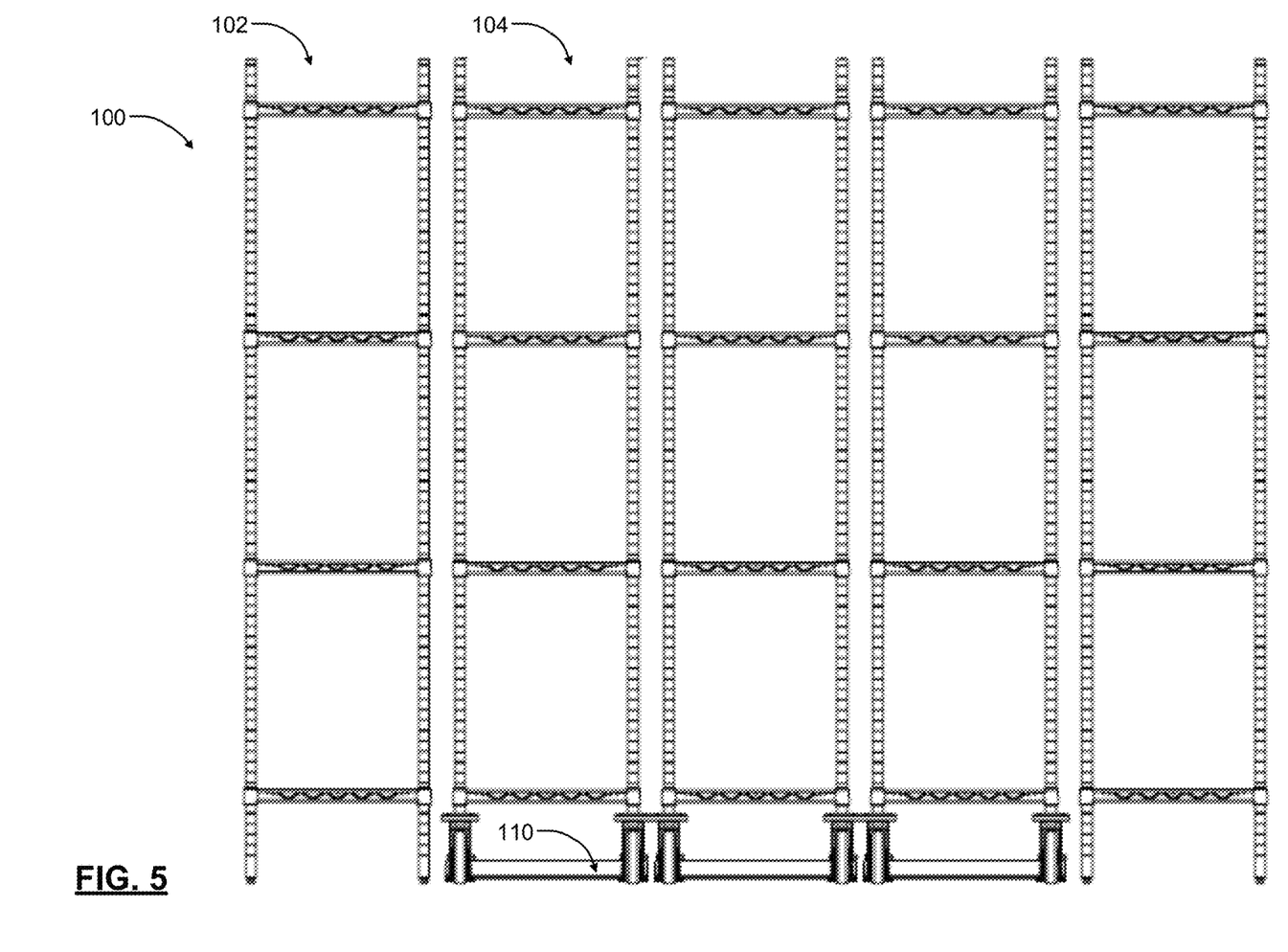
FIG. 5 is a front view of the compact storage rack system in a retracted position according to an example implementation of the present disclosure.
Figure 6:
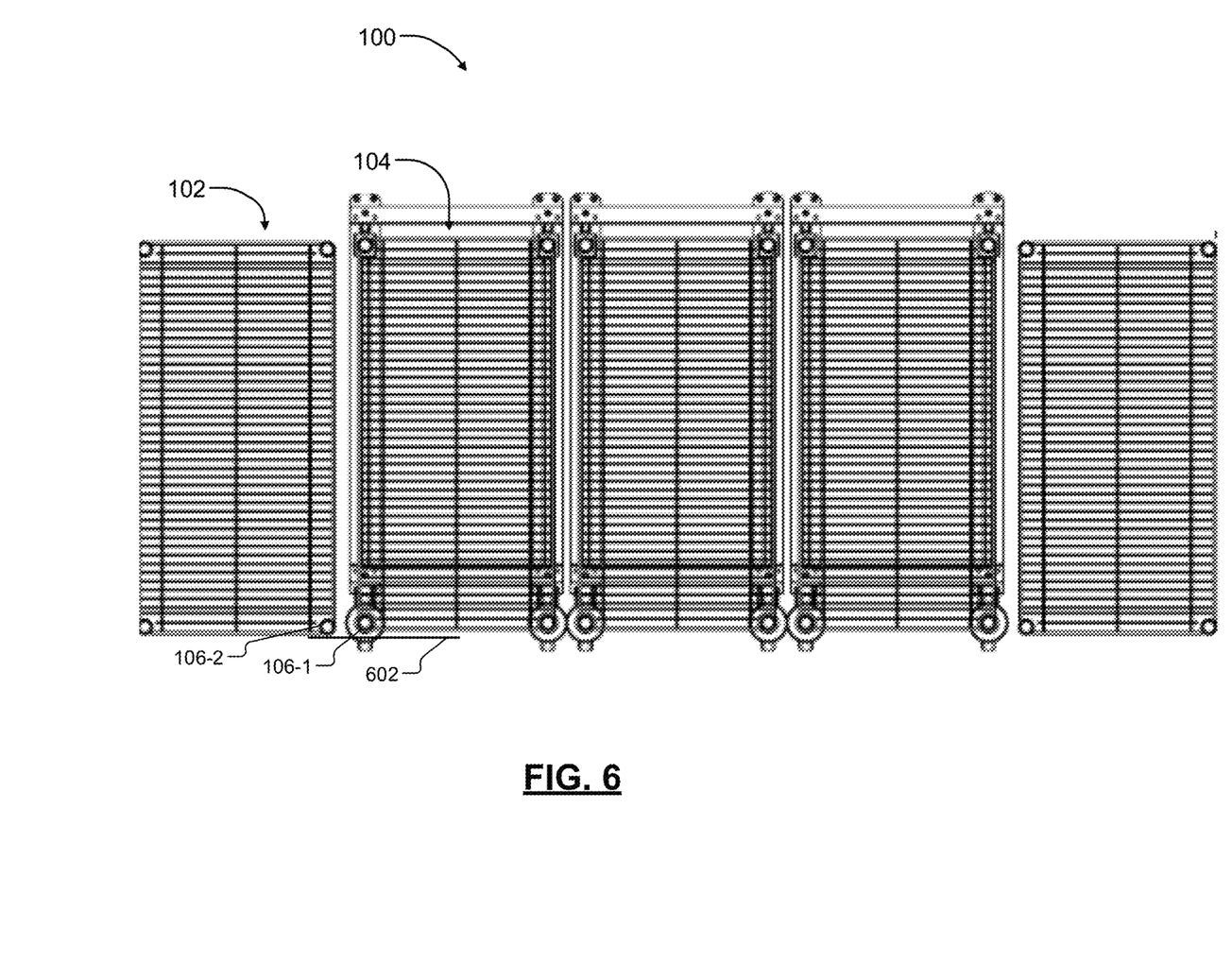
FIG. 6 is a plan view of the compact storage rack system in a retracted position according to an example implementation of the present disclosure.
Figure 7:
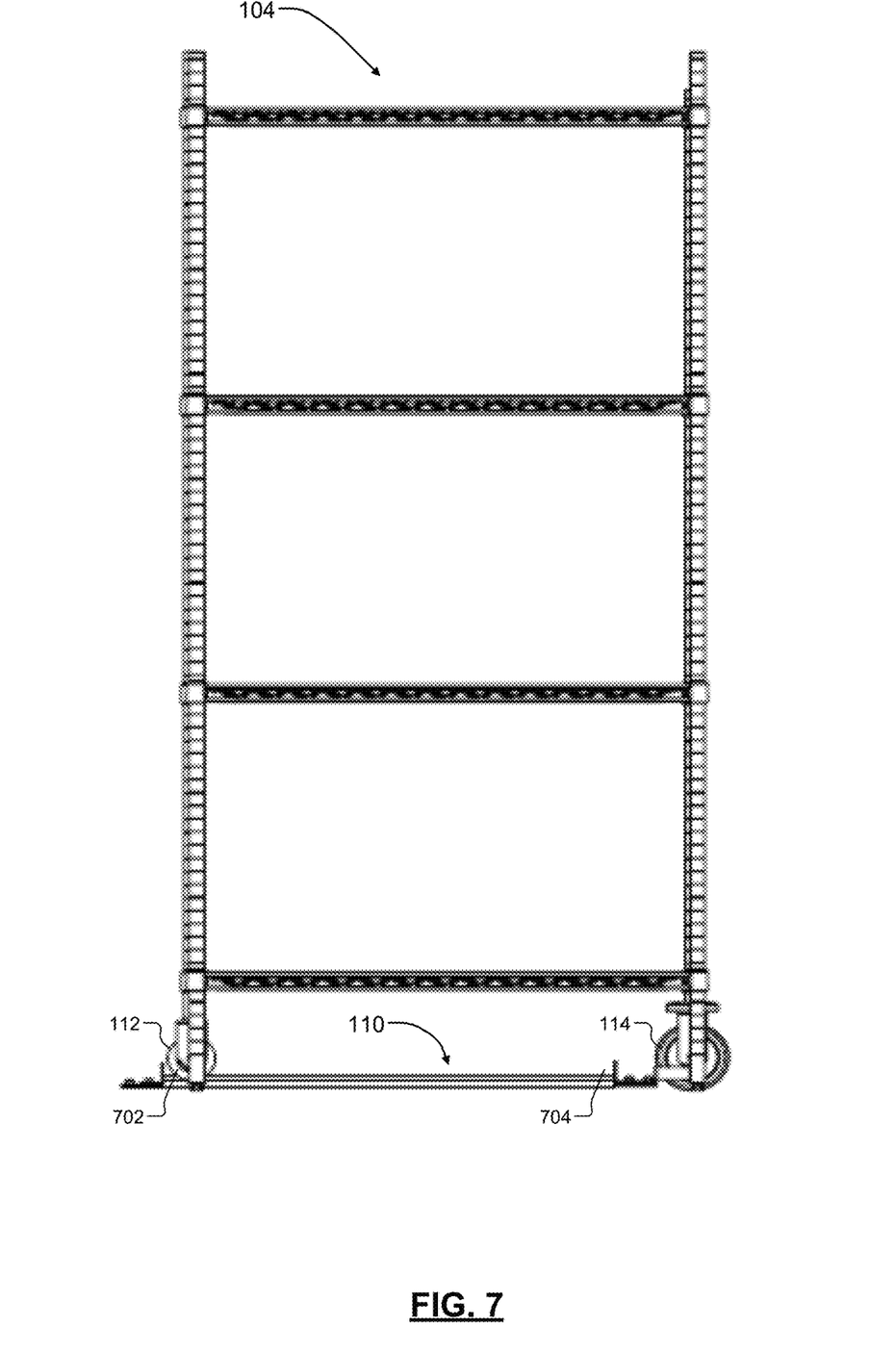
FIG. 7 is a side view of a movable shelving assembly of the compact storage rack system in a retracted position according to an example implementation of the present disclosure.

FIGS. 5 through 7 illustrate the compact storage rack system 100 in the retracted position. For example, referring to FIG. 6, a pole 106-1 of a movable shelving assembly 104 does not extend beyond a plane 602 defined parallel with respect to a pole 106-2 of a stationary shelving assembly 102 when the movable shelving assembly 104 is in the retracted position.

Referring to FIG. 7, the wheel 402 of the movable shelving assembly 104 is configured to transition between a first position 702 corresponding to the retracted position and a second position 704 corresponding to the extended position along the track assembly 110. The spreader structures 206-1, 206-2 can prevent the wheel 402 from extending beyond the first position 702 and/or the second position 704.

Figure 8:
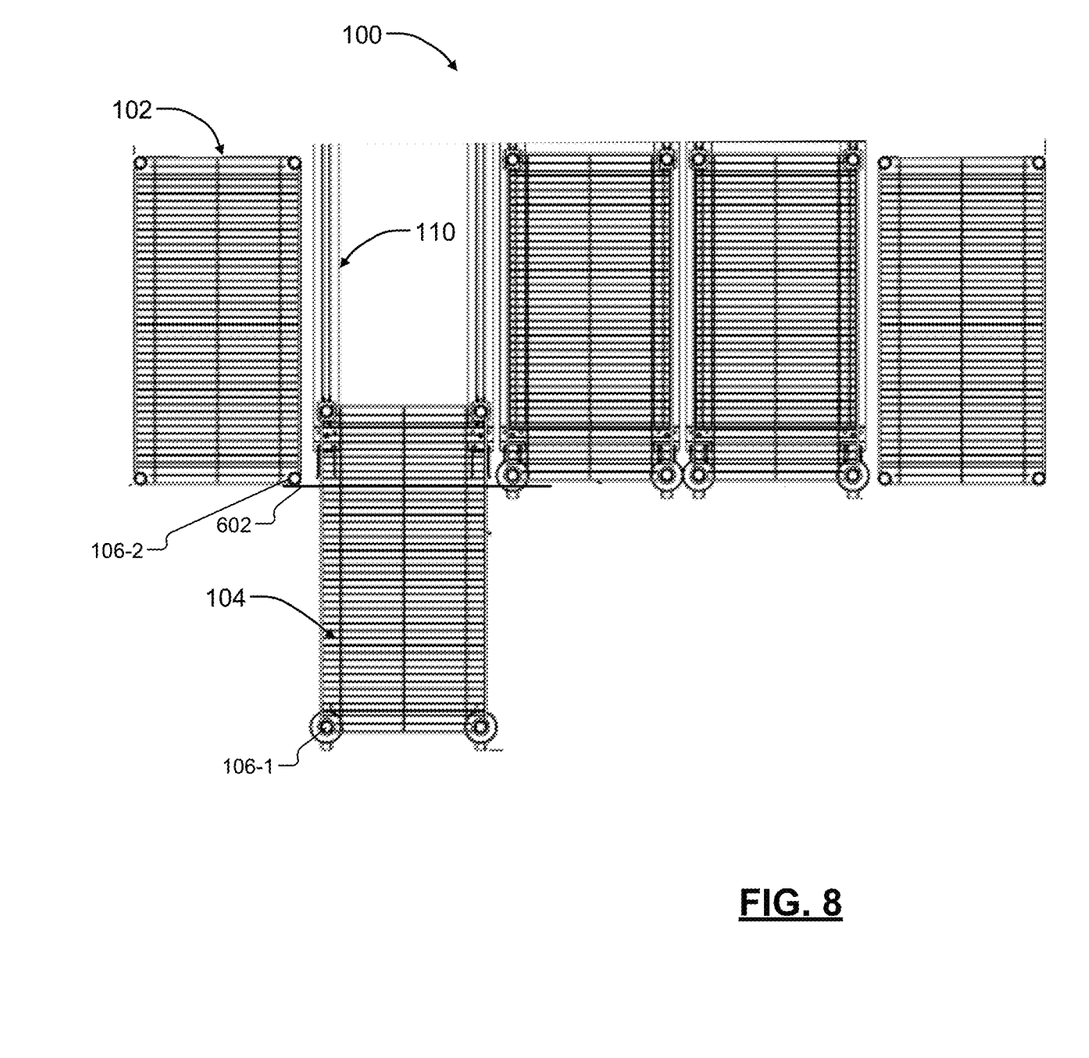
FIG. 8 is a plan view of the compact storage rack system in an extended position according to an example implementation of the present disclosure.
Figure 9:
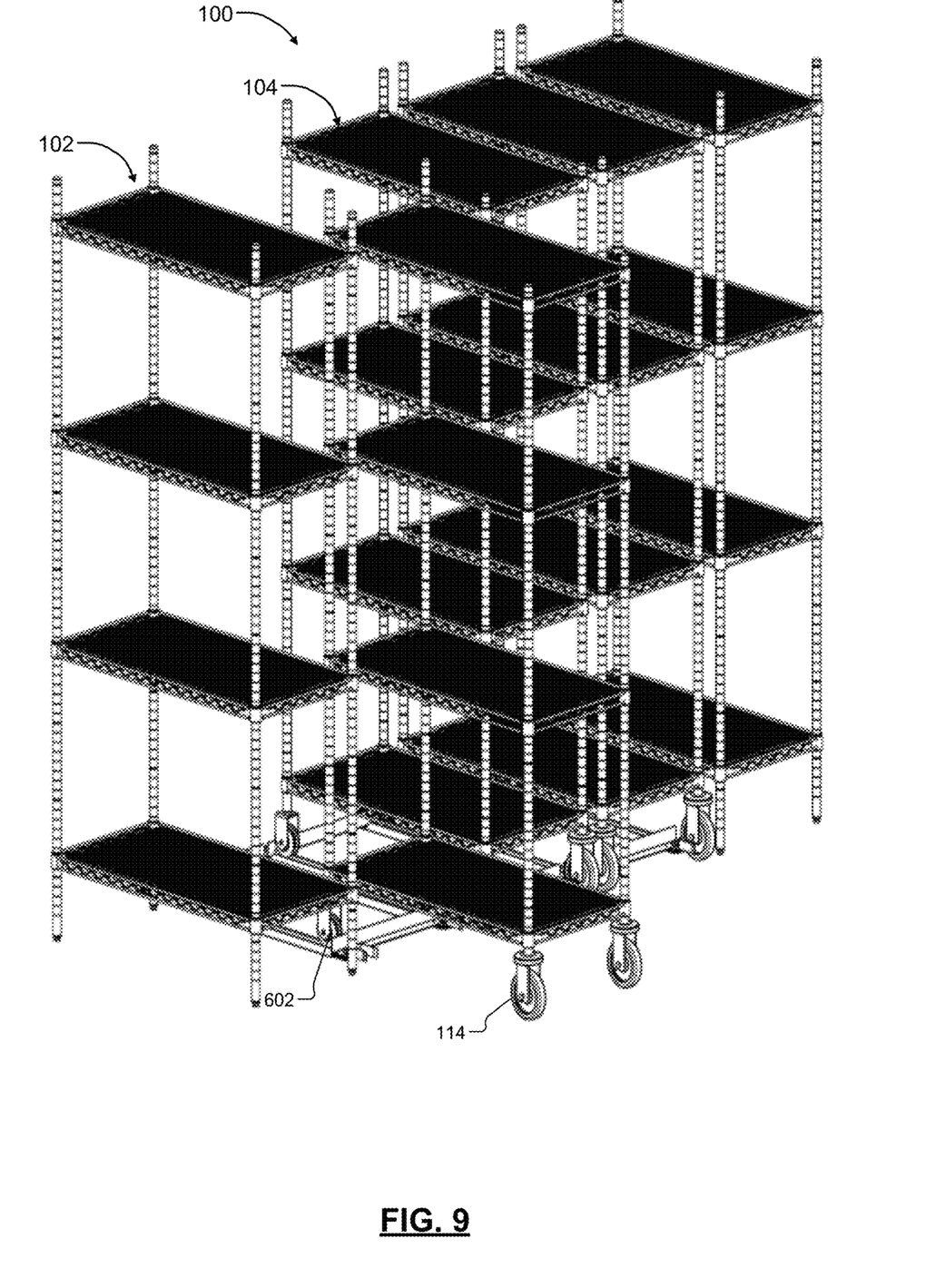
FIG. 9 is an isometric view of compact storage rack system in an extended position according to an example implementation of the present disclosure.

FIGS. 8 and 9 illustrate a movable shelving assembly 104 in an extended position. In an implementation, as shown in FIG. 8, the pole 106-1 of the movable shelving assembly 104 extends beyond the plane 602 defined parallel with respect to the pole 106-2 of the stationary shelving assembly 102.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A compact storage rack system comprising:
a track assembly comprising a first base;
a movable shelving assembly positionable between a retracted position and an extended position and including a plurality of vertically extending and parallel posts comprising a plurality of first posts and a plurality of second posts, a first set of wheels transitionally connected to the track assembly and associated with the plurality of first posts, and a second set of wheels not transitionally connected to the track assembly and associated with the plurality of second posts,
wherein the first set of wheels comprises a plurality of first wheels wherein each first wheel is rotationally fixed relative to a vertical axis of a corresponding first post, and the second set of wheels comprising a plurality of second wheels wherein each of the plurality of second wheels is not rotationally fixed relative to a vertical axis of a corresponding second post;
wherein the first set of wheels is constrained to transition along the track assembly between the retracted position and the extended position;
wherein the second set of wheels is not constrained by the track assembly between the retracted position and the extended position; and
a wheel keeper disposed at one end of the first base and configured to receive at least one second wheel of the second set of wheels when the first set of wheels is in the retracted position.

2. The compact storage rack system as recited in claim 1, wherein first base comprises a first rail, wherein the first set of wheels is transitionally connected to the first rail.

3. The compact storage rack system as recited in claim 2, wherein the track assembly further comprises a spreader structure disposed between the first base and a second base, the second base including a second rail.

4. The compact storage rack system as recited in claim 3, wherein the spreader structure comprises a right angle structure.

5. The compact storage rack system as recited in claim 1, wherein the wheel keeper comprises a U-shaped bracket.

6. The compact storage rack system as recited in claim 2, wherein at least one first wheel of the first set of wheels comprises a first flange, a second flange, and a middle portion disposed between the first flange and the second flange, wherein the first flange and the second flange are configured to retain the middle portion over the first rail.

7. The compact storage rack system as recited in claim 1, wherein at least one second wheel of the second set of wheels comprises a swivel caster wheel.

8. The compact storage rack system as recited in claim 1, further comprising:
a stationary shelving assembly disposed adjacent to the movable shelving assembly.

9. A compact storage rack system comprising:
a stationary shelving assembly;
a plurality of track assemblies; and
a plurality of movable shelving assemblies, each movable shelving assembly of the plurality of movable shelving assemblies including a first set of wheels transitionally connected to a corresponding track assembly of the plurality of track assemblies;
wherein a first movable shelving assembly of the plurality of movable shelving assemblies is disposed adjacent to the stationary shelving assembly;
wherein the first set of wheels is constrained to transition along the corresponding track assembly between a first position corresponding to a retracted position of the storage rack assembly and a second position corresponding to an extended position of the storage rack assembly and a second set of wheels, capable of swiveling about a vertical axis, is not disposed in or constrained by the track assembly between the retracted position and the extended position, and
wherein each track assembly of the plurality of track assemblies further comprises first base and a wheel keeper disposed at one end of the first base, the wheel keeper configured to receive at least one wheel of the second set of wheels when the first set of wheels are in the first position.

10. The compact storage rack system as recited in claim 9, wherein the first base of each track assembly of the plurality of track assemblies comprises a first rail, wherein the first set of wheels are transitionally connected to the first rail.

11. The compact storage rack system as recited in claim 9, wherein at least one wheel of the second set of wheels comprises a swivel caster wheel.

12. The compact storage rack system as recited in claim 9, wherein each track assembly of the plurality of track assemblies further comprises a spreader structure disposed between the first base and a second base, the second base including a second rail.

13. The compact storage rack system as recited in claim 12, wherein the spreader structure comprises a right angle structure.

14. The compact storage rack system as recited in claim 9, wherein the wheel keeper comprises a U-shaped bracket.

15. The compact storage rack system as recited in claim 10, wherein at least one wheel of the first set of wheels comprises a first flange, a second flange, and a middle portion disposed between the first flange and the second flange, wherein the first flange and the second flange are configured to retain the middle portion over the first rail.

16. The compact storage rack system as recited in claim 10, wherein a top surface of the first rail is elevated with respect to a top surface of the first base.

17. A compact storage rack system comprising:
a first stationary shelving assembly;
a second stationary shelving assembly;
a plurality of track assemblies; and
a plurality of movable shelving assemblies disposed between the first stationary shelving assembly and the second stationary shelving assembly, each movable shelving assembly of the plurality of movable shelving assemblies including a plurality of posts, a first set of wheels engaged with a corresponding track assembly of the plurality of track assemblies at a wheel-rail interface, and a second set of wheels not engaged with the corresponding track assembly, wherein the first set of wheels is configured to transition along the corresponding track assembly between a first position corresponding to a retracted position and a second position corresponding to an extended position, wherein the first set of wheels is rotationally fixed relative to a vertical axis of the plurality of posts, wherein the corresponding track assembly includes a wheel keeper that is configured to receive at least one wheel of the second set of wheels.

* * * * *

UNITED STATES PATENT AND TRADEMARK OFFICE
CERTIFICATE OF CORRECTION

PATENT NO. : 10,918,208 B2  
APPLICATION NO. : 16/402827  
DATED : February 16, 2021  
INVENTOR(S) : Gerard J. Kenlon et al.

Page 1 of 1

It is certified that error appears in the above-identified patent and that said Letters Patent is hereby corrected as shown below:

In the Claims

Column 5  
Claim 2, Line 48, after "wherein", insert --the--.

Column 6  
Claim 9, Line 24, delete "position," and insert --position;-- therefor.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*